(12) United States Patent
Urano et al.

(10) Patent No.: US 7,474,594 B2
(45) Date of Patent: Jan. 6, 2009

(54) TIME CORRECTION DEVICE, TIMEPIECE HAVING A TIME CORRECTION DEVICE, AND TIME CORRECTION METHOD

(75) Inventors: Osamu Urano, Nagano-ken (JP);
Teruhiko Fujisawa, Nagano-ken (JP);
Katsuyuki Honda, Nagano-ken (JP);
Jun Matsuzaki, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/777,898

(22) Filed: Jul. 13, 2007

(65) Prior Publication Data

US 2008/0175105 A1     Jul. 24, 2008

(30) Foreign Application Priority Data

Jul. 31, 2006     (JP)     ............... 2006-208592

(51) Int. Cl.
*G04C 11/02*     (2006.01)
*G01S 5/14*      (2006.01)
*H04B 7/185*     (2006.01)

(52) U.S. Cl. ................ 368/47; 342/357.08; 342/357.15

(58) Field of Classification Search .................... 368/10, 368/46, 47, 52; 342/352, 357.01, 357.08, 342/357.12, 357.15; 455/502
See application file for complete search history.

(56) References Cited

U.S. PATENT DOCUMENTS

| 4,287,597 A | | 9/1981 | Paynter et al. |
| 4,607,257 A | * | 8/1986 | Noguchi ................ 340/825.69 |
| 4,823,328 A | | 4/1989 | Conklin et al. |
| 5,319,374 A | * | 6/1994 | Desai et al. .................. 342/387 |
| 5,323,322 A | * | 6/1994 | Mueller et al. .............. 701/215 |
| 5,408,444 A | | 4/1995 | Kita et al. |

(Continued)

FOREIGN PATENT DOCUMENTS

DE     4202435 A1     8/1993

(Continued)

OTHER PUBLICATIONS

Lewandowski, W., et al., "GPS Time Transfer," Proceedings of the IEEE, New York, US, vol. 79, No. 7, Jul. 1, 1991, pp. 991-1000.

*Primary Examiner*—Vit W Miska

(57) ABSTRACT

A time correction device including a positioning unit that receives signals from positioning information satellites orbiting the Earth and determines the position of the positioning unit; a time correction information storage unit that stores time correction information for correcting time information produced by a time information generating unit; a time information correction unit that corrects the time information based on the time correction information; a time correction basis information storage unit that stores time correction basis information, which is basis information for generating the time correction information; a time correction information generating unit that generates the time correction information based on the time correction basis information; and a selection information storage unit for storing selection information. The time correction basis information includes plural-satellite-referenced time correction basis information; single-satellite-referenced time correction basis information and partial-satellite-signal-referenced time correction basis information. The selection information is used by the time correction information generating unit to select from the time correction basis information and apply the plural-satellite-referenced time correction basis information, the single-satellite-referenced time correction basis information, or the partial-satellite-signal-referenced time correction basis information.

6 Claims, 11 Drawing Sheets

U.S. PATENT DOCUMENTS

| | | | |
|---|---|---|---|
| 5,510,797 A * | 4/1996 | Abraham et al. | 342/352 |
| 5,621,646 A * | 4/1997 | Enge et al. | 701/120 |
| 5,724,316 A * | 3/1998 | Brunts | 368/10 |
| 5,771,001 A | 6/1998 | Cobb | |
| 5,860,056 A | 1/1999 | Pond | |
| 5,905,460 A * | 5/1999 | Odagiri et al. | 342/357.06 |
| 6,212,133 B1 * | 4/2001 | McCoy et al. | 368/9 |
| 6,563,765 B1 * | 5/2003 | Ishigaki | 368/47 |
| 6,862,526 B2 * | 3/2005 | Robbins | 701/214 |
| 7,139,225 B2 * | 11/2006 | Farmer | 368/46 |
| 2004/0190378 A1 * | 9/2004 | Farmer | 368/47 |
| 2005/0275587 A1 | 12/2005 | Siegel et al. | |
| 2006/0071852 A1 | 4/2006 | Akano | |
| 2006/0208942 A1 | 9/2006 | Vyas et al. | |

FOREIGN PATENT DOCUMENTS

| | | |
|---|---|---|
| DE | 19821320 A1 | 12/1998 |
| EP | 1014235 A2 | 6/2000 |
| FR | 2863814 | 6/2005 |
| JP | 1010251 | 1/1998 |
| JP | 1082875 | 3/1998 |
| JP | 11237462 | 8/1999 |
| JP | 2001059864 | 3/2001 |
| WO | 9527927 A1 | 10/1995 |

* cited by examiner

TIME CORRECTION DEVICE, TIMEPIECE HAVING A TIME CORRECTION DEVICE, AND TIME CORRECTION METHOD

CROSS-REFERENCE TO RELATED APPLICATIONS

Japanese Patent application No. 2006-208592 is hereby incorporated by reference in its entirety.

BACKGROUND

1. Field of Invention

The present invention relates to a time correction device for setting the time based on a signal from a positioning satellite such as a GPS satellite, to a timepiece having the time correction device, and to a method of correcting the time.

2. Description of the Related Art

The Global Position System (GPS), which is a system enabling a receiving device to determine its own position, uses satellites (GPS satellites) that each orbit the Earth on a specific path. Each GPS satellite has an on-board atomic clock and keeps time with extremely high precision.

Japanese Patent No. 3512068 (JP2001-59864) (paragraph [0001]) teaches a method of using data from the atomic clock of a GPS satellite to correct the time kept by a timepiece with high precision.

In order to get the time from the atomic clock of a GPS satellite, however, the GPS receiver must capture a GPS satellite and synchronize with the GPS satellite signal.

The GPS satellites are also constantly moving, and the approximate positions of the GPS satellites must be estimated from orbital information about the GPS satellites in order to capture a satellite.

Yet further, at least four GPS satellites must be captured in order to acquire precise time information.

In addition to capturing four moving GPS satellites being time-consuming, if the GPS receiver is built into a device such as a timepiece that also moves with the user, capturing a GPS satellite is even more difficult because the receiver is moving, and capturing four GPS satellites takes a long time.

This means that much time and power are consumed capturing the GPS satellites, and incorporating a GPS receiver into a device such as a timepiece that has a very small power supply is difficult. As a result, correcting the time kept by a timepiece with high precision is in practice not possible using GPS signals.

SUMMARY OF THE INVENTION

To solve these problems, a time correction device, a timepiece device having the time correction device, and a time correction method according to the present invention enable setting the time with high precision without high power consumption even when very little power is required.

A first aspect of the invention is a time correction device including a positioning unit that receives signals from positioning information satellites orbiting the Earth and determines the position of the positioning unit; a time correction information storage unit that stores time correction information for correcting time information produced by a time information generating unit; a time information correction unit that corrects the time information based on the time correction information; a time correction basis information storage unit that stores time correction basis information, which is basis information for generating the time correction information; a time correction information generating unit that generates the time correction information based on the time correction basis information; and a selection information storage unit for storing selection information. The time correction basis information includes plural-satellite-referenced time correction basis information that is the basis information for generating the time correction information based on signals from a plurality of positioning information satellites; single-satellite-referenced time correction basis information that is the basis information for generating the time correction information based on signals from a single positioning information satellite using positioning information acquired when the time correction information generating unit generates the time correction information based on the plural-satellite-referenced time correction basis information; and partial-satellite-signal-referenced time correction basis information that is the basis information for generating the time correction information based on a time-related signal in the signals received from a single positioning information satellite using time difference information acquired when the time correction information generating unit generates the time correction information based on the single-satellite-referenced time correction basis information. The selection information is used by the time correction information generating unit to select from the time correction basis information and apply the plural-satellite-referenced time correction basis information, the single-satellite-referenced time correction basis information, or the partial-satellite-signal-referenced time correction basis information.

This aspect of the invention has a time correction information storage unit that stores time correction information for correcting time information produced by a time information generating unit, and a time information correction unit that corrects the time information based on the time correction information.

The aspect of the invention also has a time correction basis information storage unit that stores time correction basis information, which is basis information for generating the time correction information, and a time correction information generating unit that generates the time correction information based on the time correction basis information.

More specifically, in this aspect of the invention time correction information is generated using time-based information, and the time of the time information generating unit, such as a clock, is corrected based on this time correction information.

The time correction basis information includes plural-satellite-referenced time correction basis information that is the basis information for generating the time correction information based on signals from positioning information satellites.

This plural-satellite-referenced time correction basis information can be compared with the time kept by an atomic clock on-board a GPS satellite as a result of positioning based on signals from the GPS satellites used as the positioning information satellites, and therefore enables correcting the time with high precision.

As a result, if the time correction information is generated based on the plural-satellite-referenced time correction basis information, high precision time correction is possible.

However, a problem with capturing plural satellites for positioning is that power consumption by the time correction device is high.

Therefore, the time-based information also includes single-satellite-referenced time correction basis information that is the basis information for generating the time correction information based on signals from a single positioning information satellite using positioning information acquired when the time correction information generating unit generates the time correction information based on the plural-satellite-referenced time correction basis information.

This single-satellite-referenced time correction basis information recognizes that the position of the time correction device is known as a result of positioning when generating the time correction information based on the plural-satellite-referenced time correction basis information, and uses this known position information.

More specifically, plural GPS satellites must be used when the position of the time correction device, that is, the receiver, is unknown in order to compute the position.

Furthermore, the position of both the GPS satellite and the time correction device must be known in order to determine the error between the atomic clock on-board the GPS satellite and the clock or other time information generating unit. Knowing the position of the time correction device is therefore essential.

However, the position of the time correction device was previously acquired using the plural-satellite-referenced time correction basis information and is known for use with the single-satellite-referenced time correction basis information.

Therefore, to determine the difference to the atomic clock on the GPS satellite, it is only necessary to capture a single GPS satellite and get the position (orbital position) of that satellite.

It is therefore only necessary to receive signals from a single satellite when using the single-satellite-referenced time correction basis information, and power consumption is therefore less than when using the plural-satellite-referenced time correction basis information.

By thus using both plural-satellite-referenced time correction basis information and single-satellite-referenced time correction basis information, power consumption can be reduced while continuing to correct the time with high precision.

The time-based information in this aspect of the invention also includes partial-satellite-signal-referenced time correction basis information that is the basis information for generating the time correction information based on a time-related signal in the signals received from a single positioning information satellite using time difference information acquired when the time correction information generating unit generates the time correction information based on the single-satellite-referenced time correction basis information.

This partial-satellite-signal-referenced time correction basis information uses the time difference information that is acquired when the time correction information is generated based on the single-satellite-referenced time correction basis information.

More specifically, by receiving signals from a single GPS satellite, the time difference information, which is the time difference determined by comparing the signal transmission delay time (the time required for the signal to travel from the satellite to the time correction device) or the atomic clock of the GPS satellite and the time of the time information generating unit.

This already-acquired time difference information is used.

More specifically, when the partial-satellite-signal-referenced time correction basis information is used, a GPS satellite signal is captured and only the signal portion relating to the time, particularly the GPS time (such as the TOW (time of week)) of the GPS satellite, is acquired and the satellite orbit information is not acquired.

Because the orbital location of the GPS satellite is unknown in this case, the partial-satellite-signal-referenced time correction basis information cannot be used to determine the difference between the time kept by the atomic clock on-board the GPS satellite and the time of the internal clock such as the time information generating unit, but the GPS time of the GPS satellite can be determined.

Therefore, by adding this time difference information (such as the transmission delay time or the time difference of the time information generating unit) to the value of the time-related signal such as the GPS time, the error in the time information generating unit can be determined, and the time information generating unit can be corrected with high precision.

Moreover, because the partial-satellite-signal-referenced time correction basis information uses only a small part of the signal transmitted from the GPS satellite, power consumption can be further reduced compared with when the time correction information generating unit generates the time correction information based on the single-satellite-referenced time correction basis information.

This aspect of the invention also has selection information that is used to select and apply these three modes, that is, the plural-satellite-referenced time correction basis information, the single-satellite-referenced time correction basis information, or the partial-satellite-signal-referenced time correction basis information. Therefore, by using these modes (bases) according to the selection information, power consumption can be greatly reduced while maintaining highly precise time correction.

The time correction device is therefore suited for use in devices such as timepieces that have a very small power supply.

Preferably, the plural positioning information satellites are four GPS (Global Positioning System) satellites; the plural-satellite-referenced time correction basis information is the basis information for generating the true transmission delay time and the position information of the positioning information satellites that are calculated based on an actually measured transmission delay time from transmission to reception of the signals from the four GPS satellites, and the transmission delay time that is the time produced by the time information generating unit; and the time correction information is the difference between the true transmission delay time and the measured transmission delay time.

This arrangement can produce highly accurate time correction information.

Further preferably, the single-satellite-referenced time correction basis information is the basis information for generating the true transmission delay time by a calculation based on a satellite distance that is determined from a pseudo-current position and the GPS satellite position information that is identified from the GPS satellite orbital information, where the position information that is the positioning information of the time correction device is used as the pseudo-current position, and the transmission delay time that is the time produced by the time information generating unit.

By using the position information of the time correction device, that is, the positioning information, as the pseudo-current position, this aspect of the invention can produce highly precise time correction information while reducing power consumption because capturing signals from a plurality of satellites is not necessary.

Further preferably, the time difference information used to determine the partial-satellite-signal-referenced time correction basis information includes an average of the transmission delay times acquired when the time correction information generating unit applies the single-satellite-referenced time correction basis information, and an average of the difference information; the time-related signal is GPS time information from the GPS satellite; and the GPS time information, the average transmission delay time, and the average difference information are the basis information of the time correction information.

This aspect of the invention enables highly precise time correction because the average transmission delay time and the average time differences that are acquired from the time correction information generating unit using the single-satellite-referenced time correction basis information are used.

Another aspect of the invention is a timekeeping device having a time correction device having a positioning unit that receives signals from positioning information satellites orbiting the Earth and determines the position of the positioning unit; a time information generating unit that generates time information; a time correction information storage unit that stores time correction information for correcting the time information; a time information correction unit that corrects the time information based on the time correction information; a time correction basis information storage unit that stores time correction basis information, which is basis information for generating the time correction information; a time correction information generating unit that generates the time correction information based on the time correction basis information; and a selection information storage unit for storing selection information. The time correction basis information includes plural-satellite-referenced time correction basis information that is the basis information for generating the time correction information based on signals from a plurality of positioning information satellites; single-satellite-referenced time correction basis information that is the basis information for generating the time correction information based on signals from a single positioning information satellite using positioning information acquired when the time correction information generating unit generates the time correction information based on the plural-satellite-referenced time correction basis information; and partial-satellite-signal-referenced time correction basis information that is the basis information for generating the time correction information based on a time-related signal in the signals received from a single positioning information satellite using time difference information acquired when the time correction information generating unit generates the time correction information based on the single-satellite-referenced time correction basis information. The selection information is used by the time correction information generating unit to select from the time correction basis information and apply the plural-satellite-referenced time correction basis information, the single-satellite-referenced time correction basis information, or the partial-satellite-signal-referenced time correction basis information.

This aspect of the invention enables high precision time correction with low power consumption in a watch or other timekeeping device that has a very small power supply.

Another aspect of the invention is a time correction method of correcting the time information of a time information generating unit that generates time information based on time correction information, the time correction method having: a first time correction information generating step of a time correction information generating unit producing the time correction information based on plural-satellite-referenced time correction basis information that is the basis information for generating the time correction information based on signals received by a positioning unit from a plurality of positioning information satellites orbiting the Earth; a first time information correcting step of a time information correction unit correcting the time information of the time information generating unit based on the time correction information generated by the first time correction information generating step; a second time correction information generating step of the time correction information generating unit producing the time correction information based on single-satellite-referenced time correction basis information that is the basis information for generating the time correction information based on signals from a single positioning information satellite using positioning information acquired by the positioning unit in the first time correction information generating step; a second time information correcting step of the time information correction unit correcting the time information of the time information generating unit based on the time correction information generated by the second time correction information generating step; a third time correction information generating step of the time correction information generating unit producing the time correction information based on partial-satellite-signal-referenced time correction basis information that is the basis information for generating the time correction information based on a time-related signal in the signals received from a single positioning information satellite using time difference information acquired in the second time correction information generating step; and a third time information correcting step of the time information correction unit correcting the time information of the time information generating unit based on the time correction information produced in the third time correction information generating step.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Preferred embodiments of the present invention are described below with reference to the accompanying figures.

The embodiments described below are specific desirable examples of the invention and technically desirable limitations are also noted, but the scope of the invention is not limited to these embodiments except as may be specifically described below.

Figure 1:
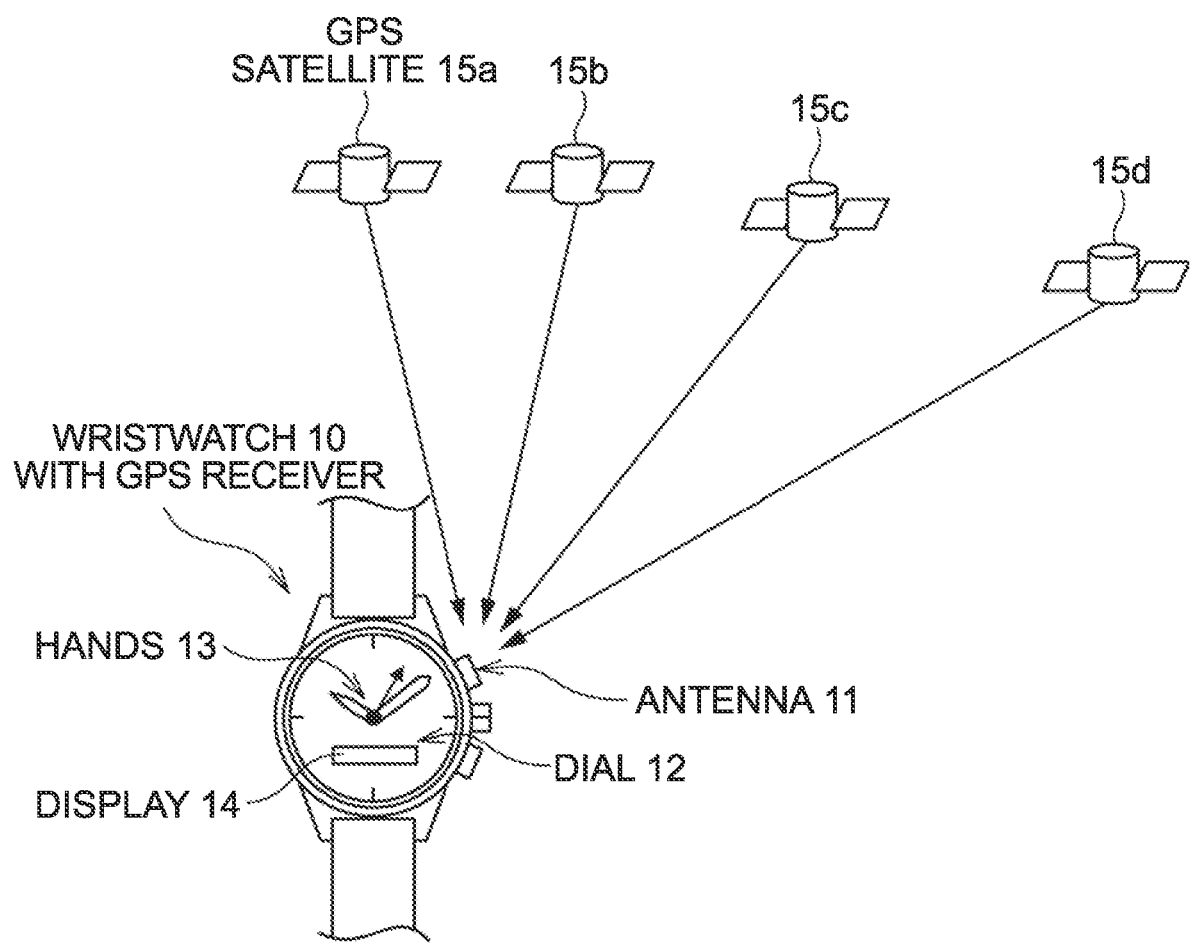
FIG. 1 shows a wristwatch with a GPS time correction device as an example of a timepiece having a time correction device according to the present invention.
Figure 2:
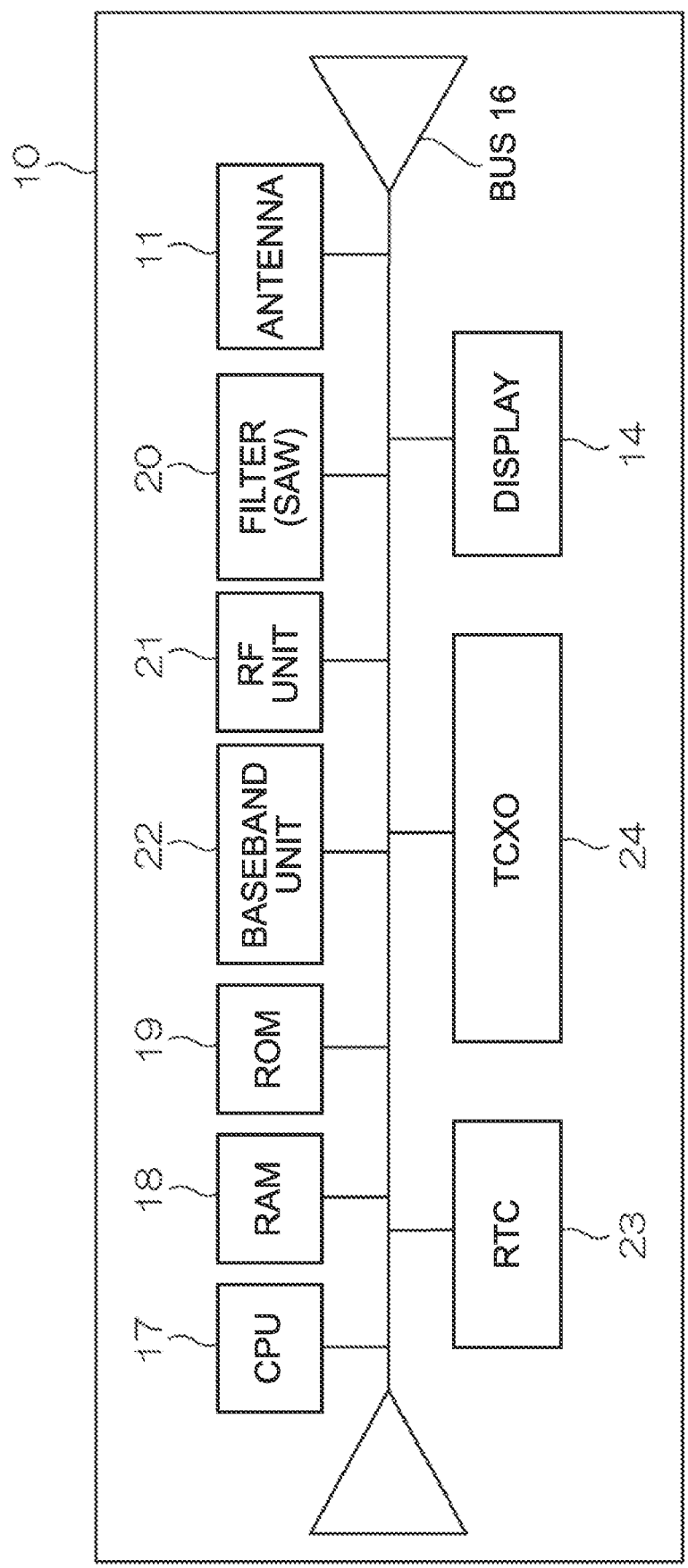
FIG. 2 is a block diagram showing the internal hardware configuration of the GPS wristwatch shown in FIG. 1.

FIG. 1 is a schematic diagram of a timepiece having a time correction device according to the present invention, which in this embodiment of the invention is described as a wristwatch 10 with a GPS time correction device (referred to below as a GPS wristwatch 10). FIG. 2 is a block diagram showing the internal hardware configuration of the GPS wristwatch 10 shown in FIG. 1.

As shown in FIG. 1 this GPS wristwatch 10 has a dial 12 with long and short hands 13 on the front, and a display 14 having an LED module and dial 12 for displaying information. The display 14 could alternatively be an LCD module or analog dial instead of an LED module.

As shown in FIG. 1 the GPS wristwatch 10 has an antenna 11, and the antenna 11 is used to receive signals from GPS satellites 15a to 15d orbiting the Earth on specific orbits. These GPS satellites 15a to 15d are simply one example of positioning system satellites that orbit the Earth.

As shown in FIG. 2 the GPS wristwatch 10 has an internal timekeeping unit and a GPS unit, and is arranged to function as a computer.

More specifically, the timekeeping unit in this embodiment of the invention renders an electronic timepiece.

The arrangement shown in FIG. 2 is further described below.

As shown in FIG. 2 the GPS wristwatch 10 has a bus 16 to which are connected a CPU 17, RAM 18, ROM 19, and other devices.

Also connected to the bus 16 is a positioning unit for determining its own position, which in this aspect of the invention is a GPS receiver by way of example. More specifically, the antenna 11, a filter (SAW) 20, RF unit 21, and baseband unit 22 are connected to the bus 16.

Signals received from the GPS satellites 15a to 15d shown in FIG. 1 are thus passed from the antenna 11 through the filter (SAW) 20 and RF unit 21 and extracted by the baseband unit 22 as the GPS signal.

The signals received from the GPS satellites 15a to 15d are described in further detail below.

A timekeeping unit is also connected to the bus 16. More specifically, a real-time clock (RTC) 23 and a temperature-compensated crystal oscillator (TCXO) 24 are connected as the timekeeping unit.

The display 14 shown in FIG. 1 is also connected to the bus 16.

The bus 16 is thus an internal bus with the addresses and data paths needed to connect all of the other requisite devices.

The RAM 18 is working memory used by the CPU 17 to execute programs and control the ROM 19 and other devices connected to the bus 16. The ROM 19 stores the programs and other data.

The real-time clock (RTC) 23 is an example of a time information generating unit for generating time information.

Figure 3:
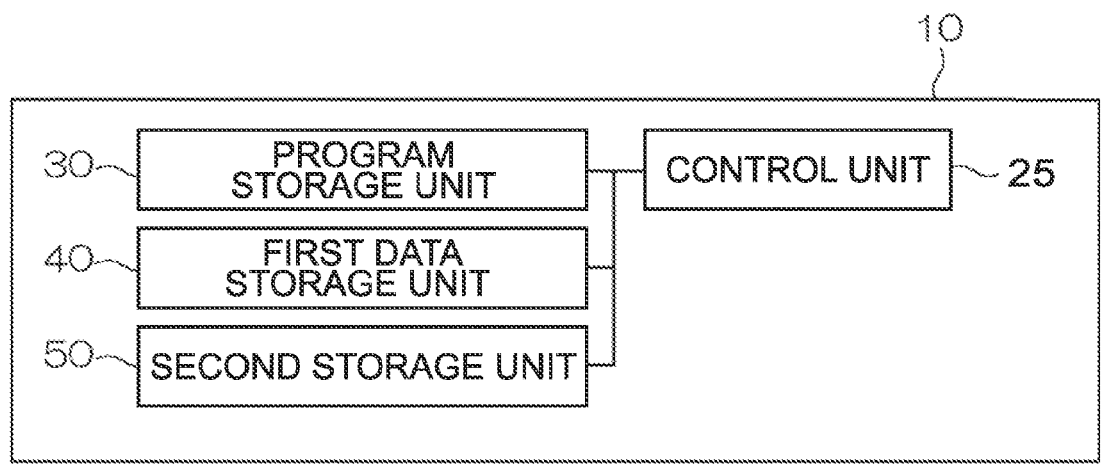
FIG. 3 is a block diagram showing the basic software arrangement of the GPS wristwatch of the invention.
Figure 4:
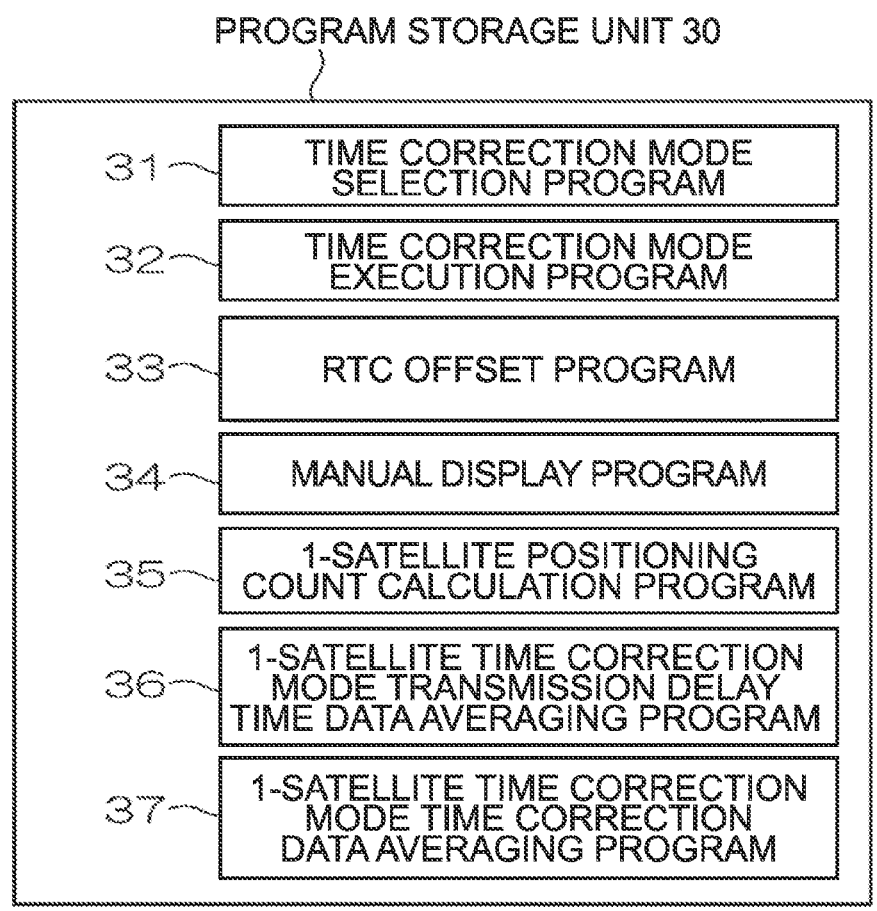
FIG. 4 is a block diagram of the data stored in the program storage unit shown in FIG. 3.
Figure 5:
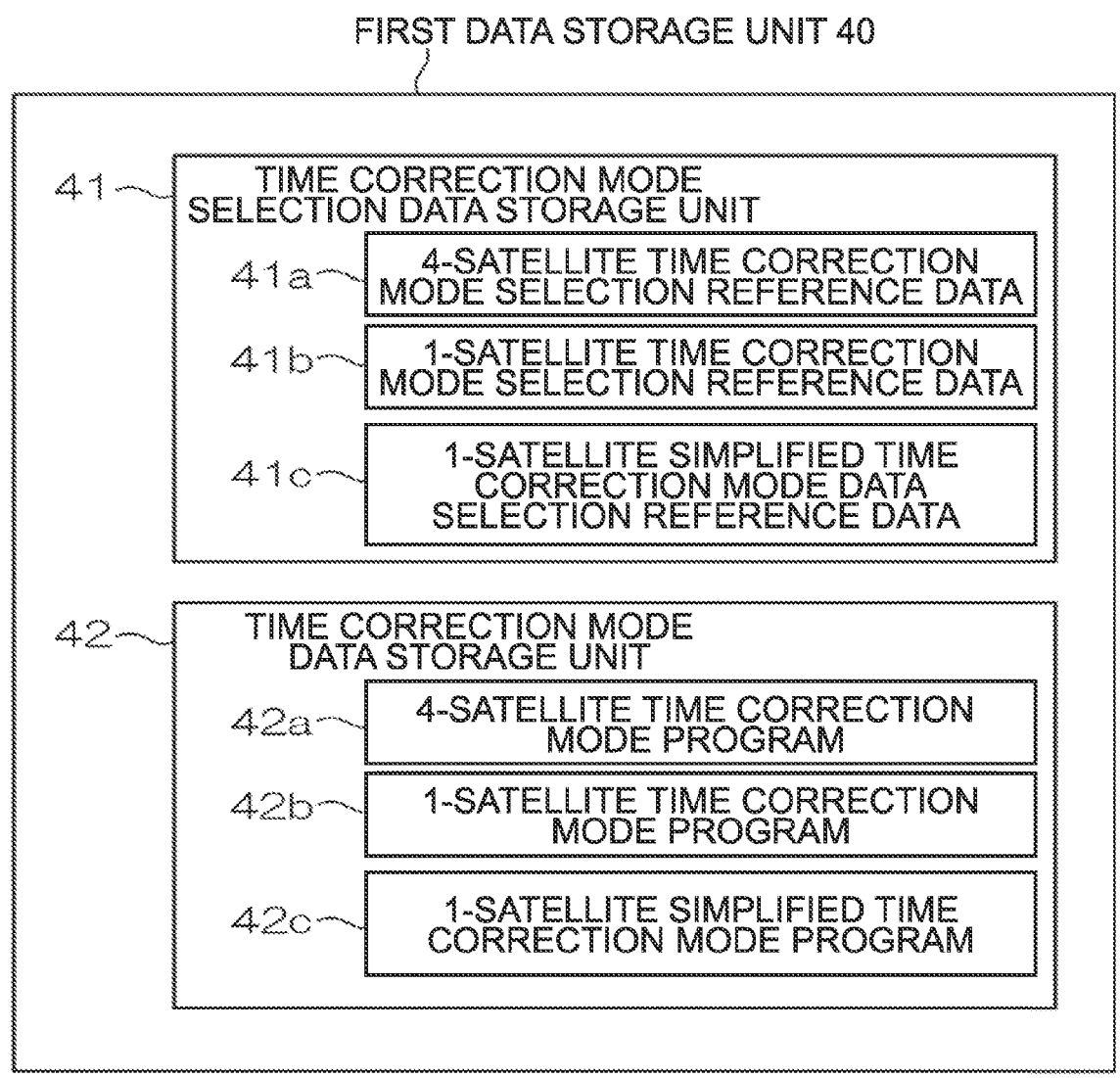
FIG. 5 is a block diagram of the data stored in the first storage unit shown in FIG. 3.

FIG. 3 to FIG. 5 are block diagrams showing the basic software structure of the GPS wristwatch 10, FIG. 3 being an overview.

As shown in FIG. 3 the GPS wristwatch 10 has a control unit 25. The control unit 25 runs the programs stored in the program storage unit 30 shown in FIG. 3, and processes data stored in the first data storage unit 40 and data stored in the second storage unit 50.

The program storage unit 30, the first data storage unit 40, and the second storage unit 50 are shown as discrete entities in FIG. 3, but the data does not need to be stored in separate devices and is shown this way for descriptive convenience only.

Furthermore, the data stored in the first data storage unit 40 shown in FIG. 3 is primarily data that is stored in advance of program execution, and the data that is stored in the second storage unit 50 is the data resulting from processing the data in the first data storage unit 40 by running a program stored in the program storage unit 30.

Figure 6:
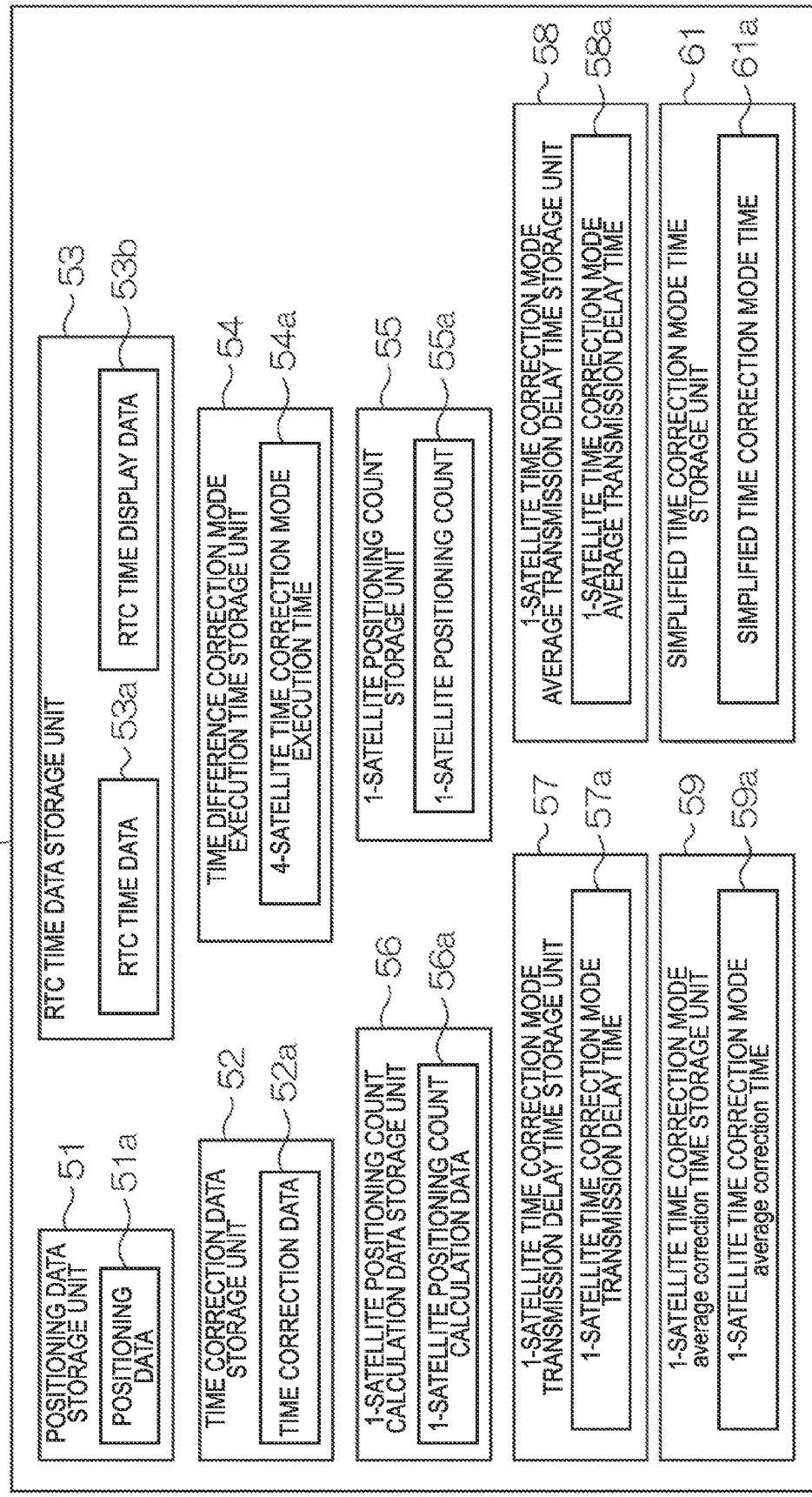
FIG. 6 is a block diagram of the data stored in the second storage unit shown in FIG. 3.

FIG. 4 is a block diagram of the data stored in the program storage unit 30 shown in FIG. 3, FIG. 5 is a block diagram of the data stored in the first data storage unit 40 shown in FIG. 3, and FIG. 6 is a block diagram of the data stored in the second storage unit 50 shown in FIG. 3.

Figure 7:
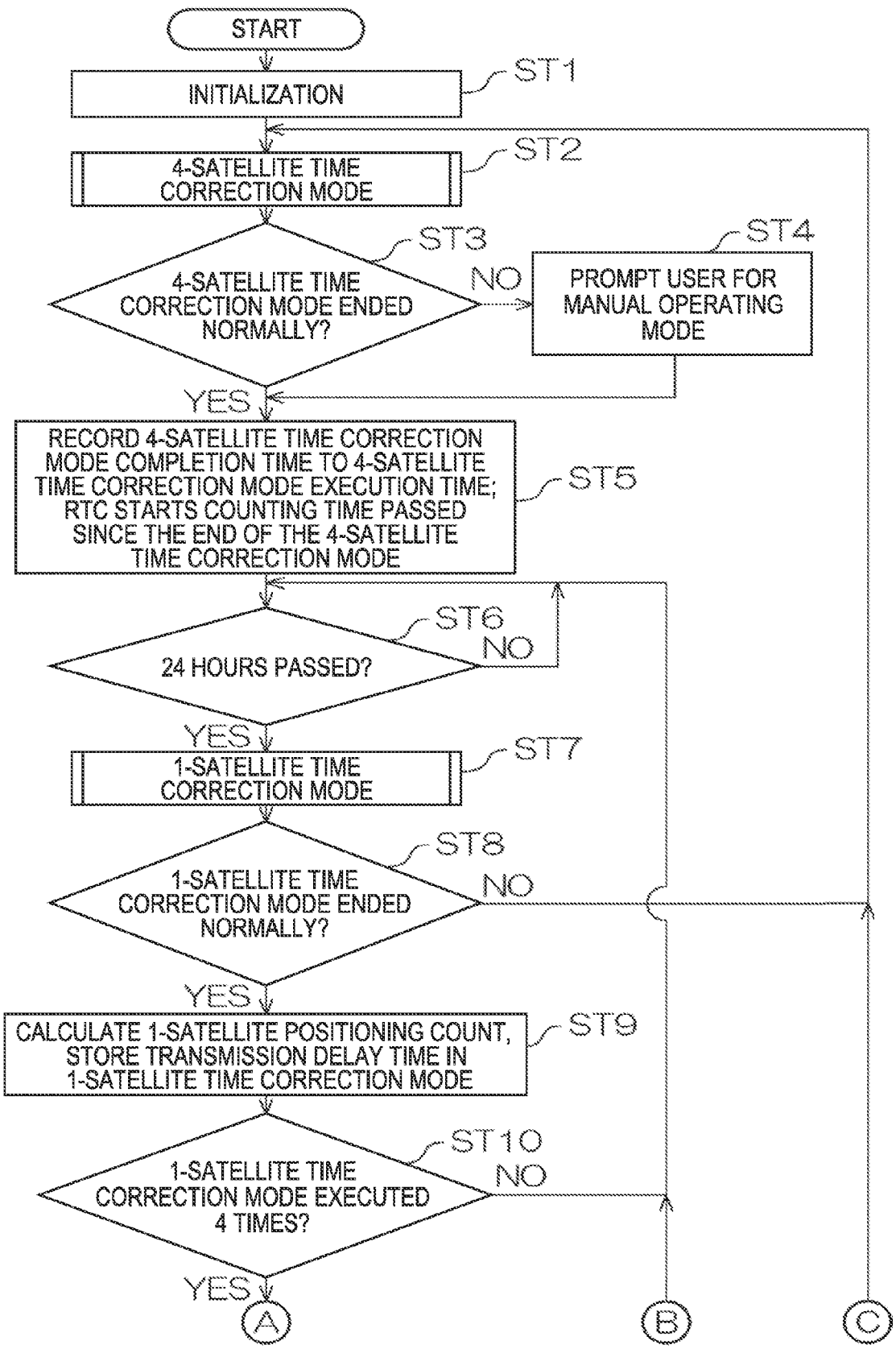
FIG. 7 is a flow chart describing the operation of the GPS wristwatch according to a preferred embodiment of the invention.
Figure 8:
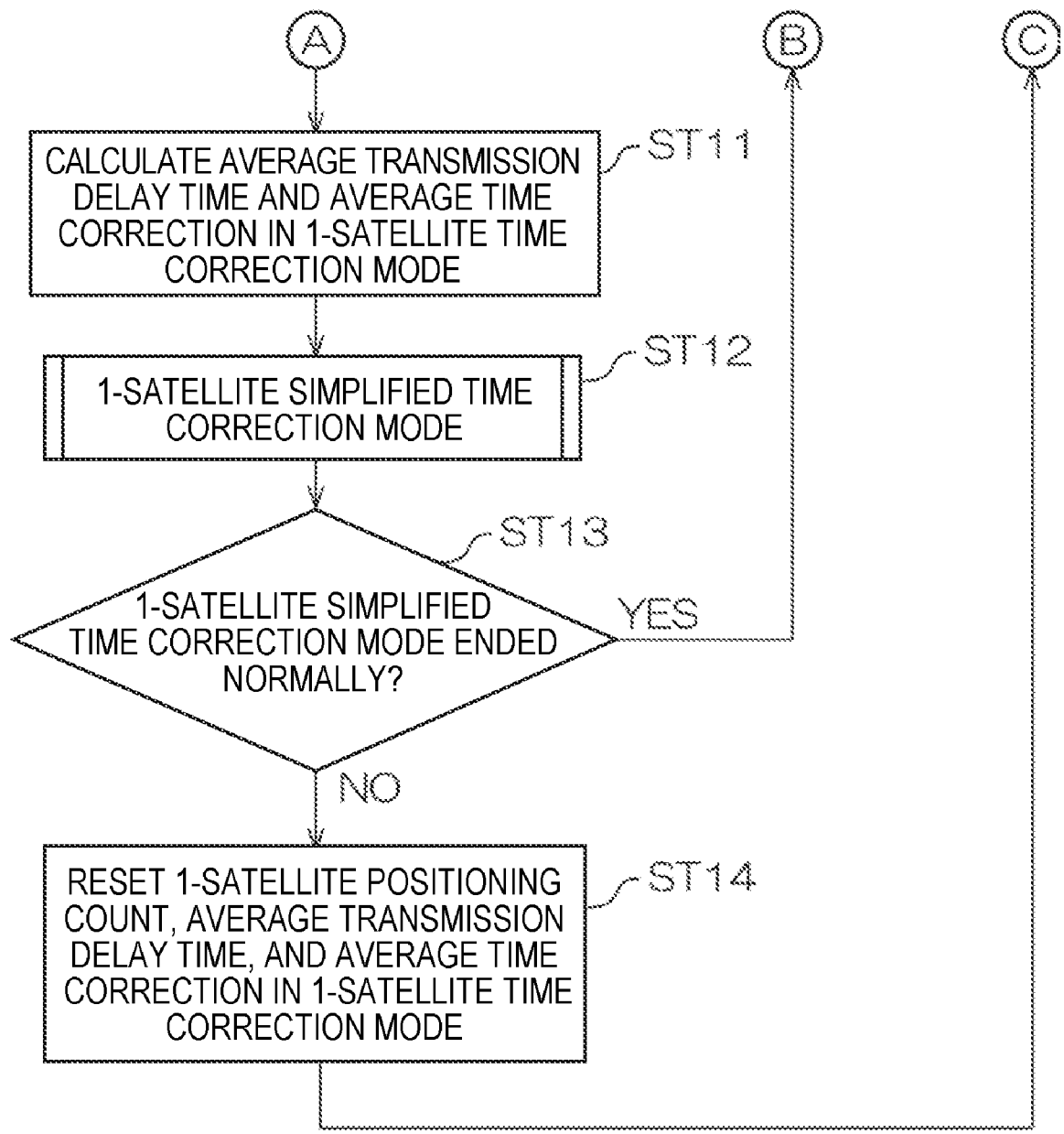
FIG. 8 is another flow chart another flow chart describing the operation of the GPS wristwatch according to a preferred embodiment of the invention.

FIG. 7 and FIG. 8 are flow charts describing the main operation of the GPS wristwatch 10 according to this embodiment of the invention.

The programs and data shown in FIG. 4 to FIG. 5 are described next while describing the operation of the GPS wristwatch 10 according to this embodiment of the invention with reference to the flow charts in FIG. 7 and FIG. 8.

In order to set the time of the internal timekeeping unit, that is, the real-time clock (RTC) 23, of the GPS wristwatch 10 shown in FIG. 1, the user causes the GPS wristwatch 10 to run the initialization step ST1 shown in FIG. 7.

This causes the time correction mode selection program 31 shown in FIG. 4 to run. The time correction mode selection program 31 references the data stored in the time correction mode selection data storage unit 41 shown in FIG. 5 to select data in the time correction mode data storage unit 42 in FIG. 5.

More specifically, the 4-satellite time correction mode selection reference data 41a in FIG. 5 is data for selecting the 4-satellite time correction mode when the real-time clock (RTC) 23 is in the initialization state.

The time correction mode selection program 31 therefore selects the 4-satellite time correction mode 42a in FIG. 5.

The time correction mode execution program 32 is an example of a time correction information generating unit for generating the time correction information described below based on time correction basis information (such as the 4-satellite time correction mode program 42a).

The time correction mode data storage unit 42 is an example of a time correction basis information storage unit for storing the time correction basis information (such as the 4-satellite time correction mode program 42a) that is the basic information used for generating the time correction information described below.

Control then goes to step ST2 in FIG. 7. The 4-satellite time correction mode is run in step ST2. More specifically, the time correction mode execution program 32 shown in FIG. 4 operates and the 4-satellite time correction mode program 42a in FIG. 5 is executed.

Figure 9:
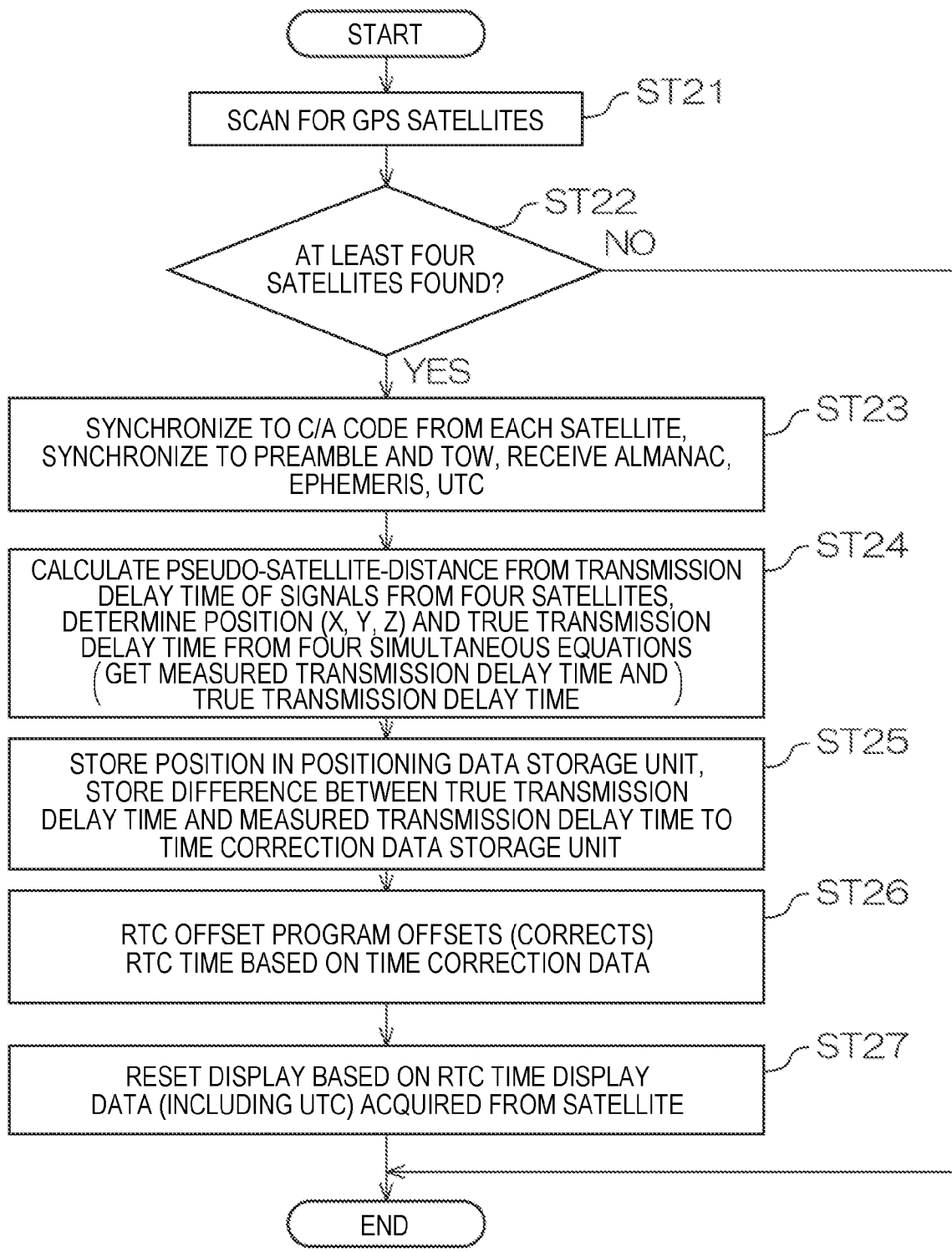
FIG. 9 is a flow chart of the time correction mode using signals from four satellites executed in step ST2 in FIG. 7.

FIG. 9 is a flow chart of the 4-satellite time correction mode executed in step ST2 in FIG. 7.

The 4-satellite time correction mode is described below with reference to FIG. 9.

This mode starts by scanning for a GPS signal in step ST21 in FIG. 9. More specifically, the GPS unit shown in FIG. 2 operates to receive a GPS signal through the antenna 11 and determine if there is a GPS satellite 15a from which a signal can be captured.

Step S22 then determines if signals can be captured from at least four GPS satellites 15a. If step ST22 returns Yes, control goes to step ST23. If step ST22 returns No, the GPS wristwatch 10 must be located where GPS satellites 15a signals cannot be received and the 4-satellite time correction mode aborts.

Signals from the selected GPS satellites 15a are then received in step ST23. The signals transmitted from the GPS satellites 15a are described below. FIG. 10 describes the format of the GPS signal.

Figure 10A:
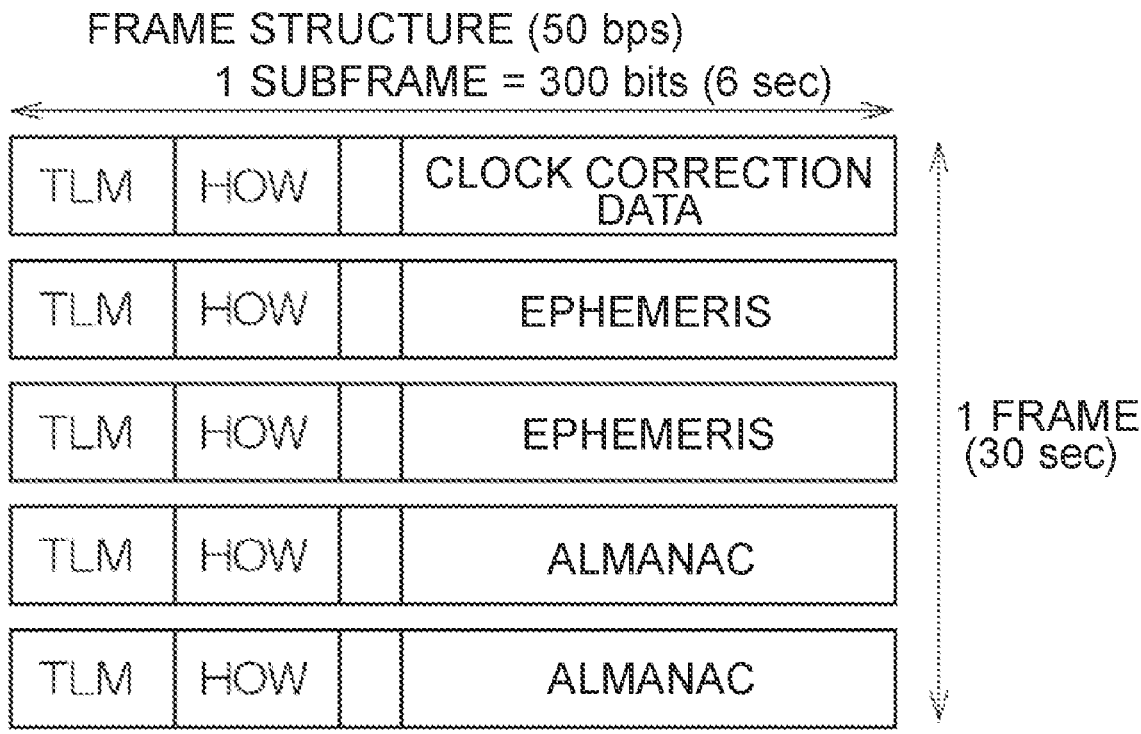
FIGS. 10A and 10B illustrate the structure of the GPS satellite signal.

As shown in FIG. 10A, each GPS satellite 15a transmits signals in data frame units and transmits one frame every 30 seconds. Each frame consists of five subframes, and one subframe is transmitted every 6 seconds. Each subframe contains 10 words (1 word is transmitted every 0.6 second).

Figure 10B:
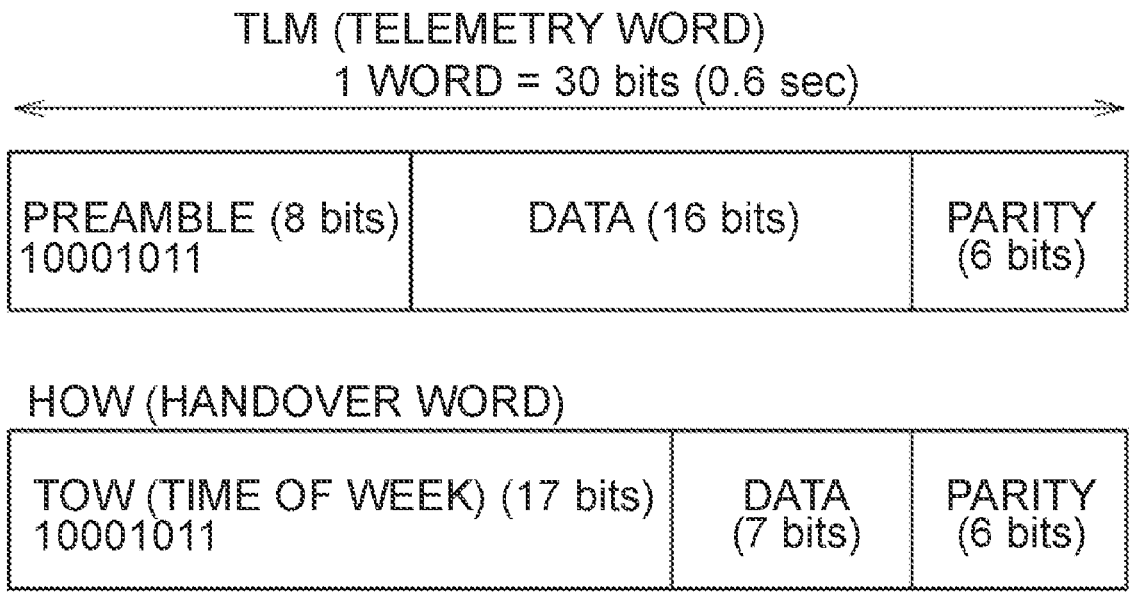

The first word in each subframe is a telemetry (TLM) word, and each TLM word starts with a preamble as shown in FIG. 10B.

The TLM word is followed by a handover word HOW, and each HOW starts with the time of week TOW indicating the GPS time information of the GPS satellite.

The GPS time is the number of seconds since 00:00:00 Sunday night, and is reset to zero at precisely 00:00:00 every Sunday night. The same GPS week number is added to the GPS time throughout the week, and the GPS receiver can therefore get the precise GPS time by reading the week number and the elapsed time (number of seconds). The GPS time is referenced to the Coordinated Universal Time (UTC).

The receiver must synchronize with the signal from the GPS satellite 15a in order to receive the frame data from a particular GPS satellite 15a, and the C/A code is used for synchronization with 1 ms precision. The C/A code is a 1023-chip pseudo random noise code that repeats every 1 ms.

To use these signals transmitted from the GPS satellites 15a, this embodiment of the invention is phase synchronized with the C/A code from each selected GPS satellite 15a and synchronized with the preamble of the TLM word and the TOW in the HOW word shown in FIG. 10B in step ST23 in FIG. 8. The data in each subframe is then decoded to acquire, for example, the ephemeris (precise orbital information for a particular GPS satellite 15a), the almanac (orbital information for all GPS satellites 15a) and the UTC (information about the universal standard time and time zone differences) as shown in FIG. 10A.

Based on the ephemeris received from the four GPS satellites 15a, the GPS wristwatch 10 measures the signal transmission time from each of the GPS satellites 15a (the time it took the signals to travel from the GPS satellite to the GPS wristwatch 10) using the internal real-time clock (RTC) 23, and based on this transmission time and the speed of light calculates the pseudo-satellite-distance between the GPS wristwatch 10 and each of the four GPS satellites 15a in step ST24.

Based on this pseudo-satellite-distance to each of the four selected GPS satellites 15a, the position (X, Y) and altitude (Z) of the GPS wristwatch 10, and the true transmission delay time (T) are calculated in four simultaneous equations to determine the position and altitude (X, Y, Z) of the GPS wristwatch 10 and the true transmission delay time (T).

Step ST24 thus determines the true transmission delay time and the transmission delay time measured by the real-time clock (RTC) 23.

The 4-satellite time correction mode program 42a is thus arranged to acquire the transmission delay time that is measured by the real-time clock (RTC) 23, and the position of the GPS wristwatch 10 and the true transmission delay time, which are calculated based on the transmission delay time that is the actually measured signal transmission time of the signals from each of the four GPS satellites 15a.

In step ST25 the positioning position is stored as the positioning data 51a in the positioning data storage unit 51. The difference between the true transmission delay time calculated in step ST24 and the transmission delay time measured by the real-time clock (RTC) 23 is then stored in the time correction data storage unit 52 as time correction data 52a.

The RTC offset program 33 shown in FIG. 4 then runs in step ST26 to offset (correct) the RTC time data in the RTC time data storage unit 53 based on the time correction data 52a shown in FIG. 6.

The time correction data storage unit 52 is an example of a time correction information storage unit for storing the time correction information (such as time correction data 52a) for correcting the RTC time information (such as RTC time data 53a).

The time correction data 52a is the difference between the true transmission delay time and the transmission delay time that was measured by the RTC 23.

The RTC offset program 33 is an example of a time information correcting unit for correcting the RTC time data 53a based on the time correction data 52a in FIG. 6.

The time displayed on the dial 12 is then corrected based on the RTC time display data 53b shown in FIG. 6, which also contains the UTC information acquired from the GPS satellites 15a.

The displayed time is therefore corrected to account for the time difference so that, for example, the local time in Japan is displayed.

The 4-satellite time correction mode then ends. Because the time correction mode corrects the RTC time data 53a of the real-time clock (RTC) 23 in the GPS wristwatch 10 using time information transmitted from GPS satellites 15a that have an on-board atomic clock, the time kept by the GPS wristwatch 10 can be corrected with extremely high precision.

The 4-satellite time correction mode program 42a shown in FIG. 5 is an example of plural-satellite-referenced time correction basis information that is the basis information for generating the time correction data 52a based on signals from a plurality of GPS satellites 15a.

This completes step ST2 in FIG. 7.

In step ST3 the time correction mode execution program 32 determines if the 4-satellite time correction mode program 42a terminated normally. If it did not end normally, step ST4 displays a prompt asking the user to set the time manually.

More specifically, the manual display program 34 shown in FIG. 4 executes to display a prompt instructing the user to manually set the time on the display 14 shown in FIG. 1 and FIG. 2.

Control then goes to step ST5. In step ST5 the time correction mode execution program 32 stores the time at which execution of the 4-satellite time correction mode program 42a ended as the 4-satellite time correction mode execution time 54a in the 4-satellite time correction mode execution time storage unit 54.

The time correction mode execution program 32 then causes the real-time clock (RTC) 23 to count the time elapsed after the 4-satellite time correction mode program 42a ended.

The time correction mode selection program 31 in FIG. 4 runs to reference the 1-satellite time correction mode selection reference data 41b in FIG. 5. The 1-satellite time correction mode selection reference data 41b indicates that the 1-satellite time correction mode program 42b shown in FIG. 5 is to execute 24 hours after the 4-satellite time correction mode ends.

The time correction mode selection program 31 therefore determines in step ST6 whether 24 hours have passed, and control goes to step ST7 if 24 hours have passed.

Based on the 1-satellite time correction mode program 42b stored in the time correction mode data storage unit 42 in FIG. 5, the time correction mode execution program 32 in FIG. 4 executes the 1-satellite time correction mode in step ST7.

Figure 11:
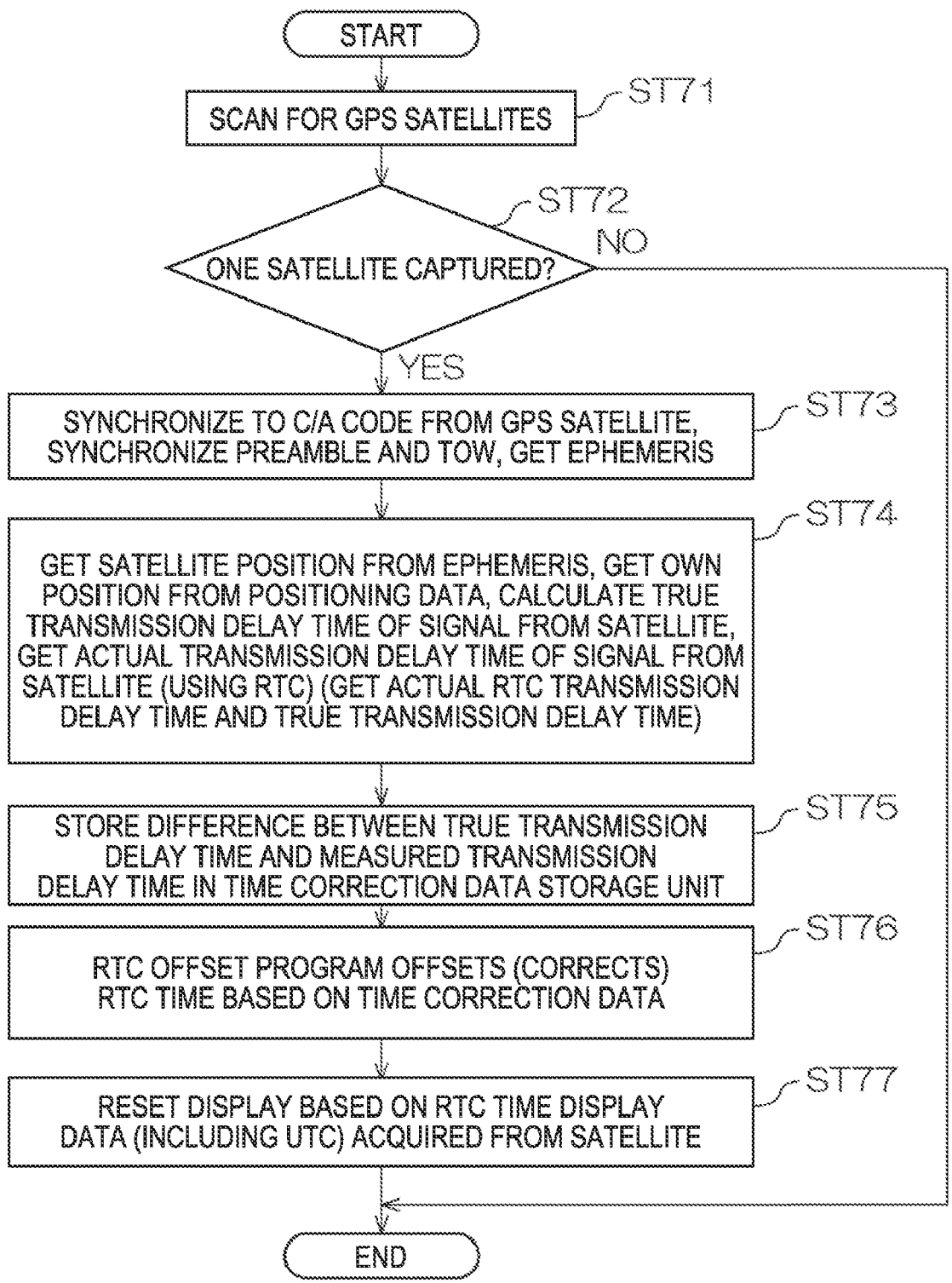
FIG. 11 is a flow chart of the time correction mode using signals from one satellite executed in step ST7 in FIG. 7.

FIG. 11 is flow chart of the 1-satellite time correction mode in FIG. 7.

The 1-satellite time correction mode is described below with reference to FIG. 11.

In step ST71 the GPS unit in FIG. 2 operates to scan for a GPS satellite 15a, and step ST72 determines if one or more GPS satellites 15a was located. If step ST72 returns Yes, step ST73 synchronizes with the C/A code received from the located GPS satellites 15a, synchronizes with the preamble and TOW shown in FIG. 10B, and gets the ephemeris.

In step ST74 the orbital position of the GPS satellite 15a is determined from the received ephemeris data, and the position of the GPS wristwatch 10, which is the position determined in the 4-satellite time correction mode in step ST2 in FIG. 7, is retrieved from the positioning data 51a in FIG. 6.

The true transmission delay time of the signals from the GPS satellite 15a (the satellite distance) is then calculated. The actual transmission delay time of the signals received from the GPS satellite 15a is also measured using the RTC 23.

The actual transmission delay time and the true transmission delay time are thus acquired.

In step ST75 the time correction mode execution program 32 stores the difference between the true transmission delay time acquired in step ST74 and the actual transmission delay time measured by the RTC 23 as the time correction data 52a in the time correction data storage unit 52 in FIG. 6.

In steps ST76 and ST77 the RTC offset program 33 offsets (corrects) the RTC 23 time based on the time correction data 52a as in steps ST26 and ST27 in FIG. 9. The time shown on the dial 12 of the GPS wristwatch 10 in FIG. 1 is then corrected based on the RTC time display data 53b that includes the UTC data received from the satellite.

This ends the 1-satellite time correction mode.

A RTC 23 such as used in this GPS wristwatch 10 gradually introduces error over time, and this error must be corrected every 24 hours in order to maintain the accurate time.

If the 4-satellite time correction mode shown in step ST2 in FIG. 7 is used every time to correct this error, signals and data from four GPS satellites 15a must be captured every time. This increases power consumption and is a significant burden for small devices such as wristwatches that have a very small power supply.

Because the position of the GPS wristwatch 10 is known after the 4-satellite time correction mode has executed once in step ST2, this embodiment of the invention uses this position information (the positioning data 51a in FIG. 6) to correct the time using only one GPS satellite 15a instead of capturing signals from four GPS satellites 15a.

More specifically, in order to accurately calculate the signal transmission delay time between the GPS satellite 15a and the GPS wristwatch 10 (the time required for the signal to reach the GPS wristwatch 10), the position of the GPS wristwatch 10 must be known in addition to the position of the GPS satellite 15a. As a result, the position of the GPS wristwatch 10 is first determined using four GPS satellites 15a in step ST2.

However, because the position of the GPS wristwatch 10 is already known in the 1-satellite time correction mode in step ST7, the true transmission delay time from the GPS satellite 15a to the GPS wristwatch 10 can be calculated if the position of the one GPS satellite 15a is known and signals and data can be received. The RTC 23 can also measure the actual transmission delay time by receiving the satellite time information (TOW), and by storing the difference between the true transmission delay time and the measured transmission delay time as the time correction data 52a, the time can be corrected with high precision similarly to the 4-satellite time correction mode in step ST2.

Furthermore, by capturing and receiving data from only one GPS satellite 15a, the 1-satellite time correction mode also greatly reduces power consumption compared with when signals from four GPS satellites 15a are captured.

By using both a 4-satellite time correction mode and a 1-satellite time correction mode, this embodiment of the invention maintains highly precise time correction while also reducing power consumption.

The 1-satellite time correction mode program 42b in FIG. 5 is an example of single-satellite-referenced time correction basis information that is the basis information for generating the time correction data 52a based on signals from one GPS satellite 15a using the positioning data 51a acquired when the time correction mode execution program 32 generates the time correction data 52a based on the 4-satellite time correction mode program 42a.

The 1-satellite time correction mode program 42b is an example of the basis information for determining the transmission delay time measured by the RTC 23 and the true transmission delay time. As described above, the true transmission delay time is calculated using the positioning data 51a of the GPS wristwatch 10 that is positioning information, and the satellite distance, which is determined from the pseudo-current position and the position of the GPS satellite 15a determined from the orbital information (ephemeris) of the GPS satellite 15a.

Step ST7 above is an example of the second time correction information generating step and the second time information correction step.

When step ST7 in FIG. 7 ends, control goes to step ST8. Step ST8 determines if step ST7 ended normally based on the 1-satellite time correction mode program 42b. If step ST7 did not end normally, the 4-satellite time correction mode in step ST2 is executed as shown in FIG. 7.

This assures that the time is corrected with high precision.

If step ST8 determines the 1-satellite time correction mode ended normally, control goes to step ST9.

In step ST9, the time correction mode execution program 32 first stores the execution count when the 1-satellite time correction mode ends as the 1-satellite positioning count 55a in the 1-satellite positioning count storage unit 55 in FIG. 6.

The 1-satellite positioning count calculation program 35 in FIG. 4 then adds the 1-satellite positioning count 55a to the 1-satellite positioning count calculation data 56a (stored in the 1-satellite positioning count calculation data storage unit 56), which is the cumulative count to the last time the mode executed.

The time correction mode execution program 32 then stores the above-described true transmission delay time (calculated delay time) acquired in the 1-satellite time correction mode in step ST7 as the 1-satellite time correction mode transmission delay time 57a in FIG. 6 to the 1-satellite time correction mode transmission delay time storage unit 57.

Control then goes to step ST10. In step ST10 the time correction mode selection program 31 references the 1-satellite simplified time correction mode data selection reference data 41c in FIG. 5.

The 1-satellite simplified time correction mode data selection reference data 41c defines the conditions for executing the 1-satellite simplified time correction mode, such as when the 1-satellite positioning count calculation data 56a is greater than or equal to 4.

As a result, the time correction mode selection program 31 references the 1-satellite positioning count calculation data 56a in FIG. 6 in step ST10 to determine if it is greater than or equal to 4.

If it is not greater than or equal to 4, the 1-satellite time correction mode executes again as shown in FIG. 7, and high precision time correction is assured.

If in step ST10 the count is not greater than or equal to 4, control goes to step ST11 in FIG. 8.

In step ST11 the 1-satellite time correction mode transmission delay time data averaging program 36 in FIG. 4 calculates the average of the four most recent values stored in the 1-satellite time correction mode transmission delay time storage unit 57 in FIG. 6, and stores the result as the 1-satellite time correction mode average transmission delay time 58a in the 1-satellite time correction mode average transmission delay time storage unit 58.

The 1-satellite time correction mode time correction data averaging program 37 in FIG. 4 runs to calculate the average of the four most recent time correction data 52a values stored in the time correction data storage unit 52 in FIG. 6, and stores the result as the 1-satellite time correction mode average correction time 59a in the 1-satellite time correction mode average correction time storage unit 59.

The 1-satellite simplified time correction mode then executes in step ST12. More specifically, the time correction mode execution program 32 in FIG. 4 references the 1-satellite simplified time correction mode program 42c in the time correction mode data storage unit 42 in FIG. 5 and executes the 1-satellite simplified time correction mode.

Figure 12:
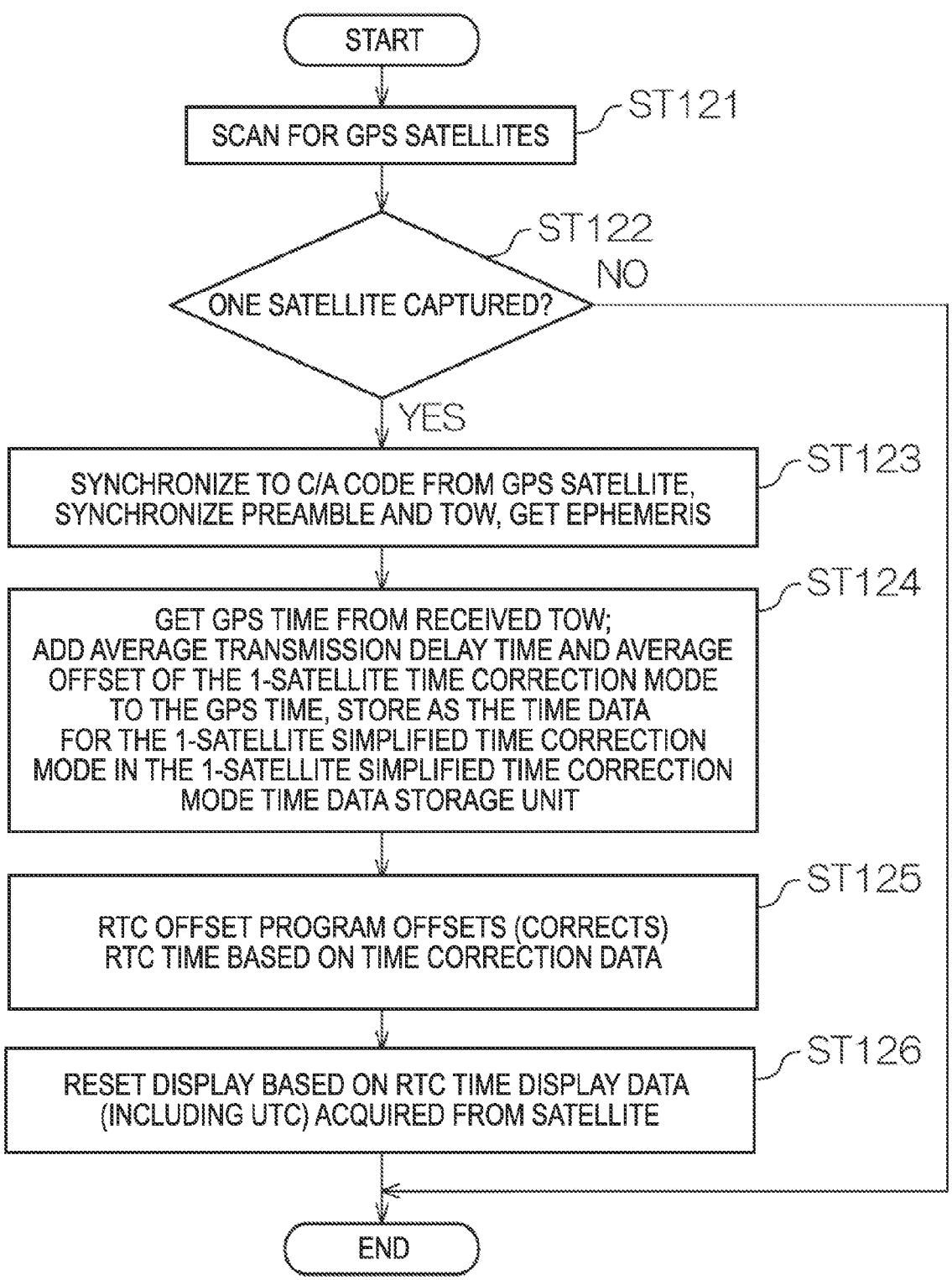
FIG. 12 is a flow chart of the simple time correction mode using signals from one satellite executed in step ST12 in FIG. 8.

FIG. 12 is a flow chart of the 1-satellite simplified time correction mode executed in step ST12 in FIG. 8.

The 1-satellite simplified time correction mode is described below with reference to FIG. 12.

In step ST121 and ST122 the GPS unit in FIG. 2 scans for a GPS satellite 15a and determines if one GPS satellite 15a was located.

If a GPS satellite 15a is found, control goes to step ST123 to synchronize with the C/A code received from the located GPS satellite 15a, and synchronize with the preamble and TOW shown in FIG. 10B.

Control then goes to step ST124. In step ST124 the GPS time is acquired from the TOW shown in FIG. 10B, and the ephemeris and other data from the GPS satellite 15a shown in FIG. 10A is not received.

The 1-satellite simplified time correction mode therefore receives signals from the GPS satellite 15a for less time than the 1-satellite time correction mode executed in step ST7 in FIG. 7, and is therefore an operating mode that can further reduce power consumption.

Because the orbital position of the captured GPS satellite 15a is not known in this mode, the satellite distance between the GPS satellite 15a and the GPS wristwatch 10 is also not known, and the true transmission delay time cannot be calculated.

This mode therefore uses the data described below. First, the GPS time, which is the time of the captured GPS satellite 15a on its orbit, can be determined from the TOW.

The missing information that is needed to use this GPS time as the time of the GPS wristwatch 10 is the transmission delay time for carrying the signal from the GPS satellite 15a to the GPS wristwatch 10, and the error (time difference) of the RTC 23 in the GPS wristwatch 10.

This mode therefore uses the 1-satellite time correction mode average transmission delay time 58a in FIG. 6 as the transmission delay time. This value is the average of the four most recent true transmission delay times and is therefore highly reliable.

The 1-satellite time correction mode average correction time 59a in FIG. 6 is used as the error time of the RTC 23. This value is also the four most recent average error times (offset times) of the RTC 23 and is therefore highly reliable.

In step ST124, therefore, the time correction mode execution program 32 adds the 1-satellite time correction mode average transmission delay time 58a and the 1-satellite time correction mode average correction time 59a to the GPS time acquired from the captured GPS satellite 15a, and stores the result as the simplified time correction mode time 61a in FIG. 6 to the simplified time correction mode time storage unit 61.

Control then goes to step ST125. In step ST125 the RTC offset program 33 in FIG. 4 operates to correct the RTC time data 53a based on the simplified time correction mode time 61a in FIG. 6.

Then in step ST126 the time shown on the dial 12 is corrected based on the RTC time display data 53b in FIG. 6.

This completes the 1-satellite simplified time correction mode.

The reception time in the 1-satellite simplified time correction mode is therefore short because the ephemeris is not received even though a GPS satellite 15a signal is received, and therefore further reduces power consumption compared with the 1-satellite time correction mode.

In addition, the time can still be corrected with the same high precision as with the 1-satellite time correction program 42b because the GPS time is determined from the TOW of the GPS satellite 15a, the high reliability 1-satellite time correction mode average transmission delay time 58a and 1-satellite time correction mode average correction time 59a are added to the GPS time to generate the simplified time correction mode time 61a, and the RTC time data 53a is corrected based on this time 61a.

The 1-satellite time correction mode average transmission delay time 58a and the 1-satellite time correction mode average correction time 59a in FIG. 6 are an example of time difference information, and the GPS time determined from the TOW is an example of a signal related to the time carried in the signals from a plurality of GPS satellites 15a.

The simplified time correction mode time 61a is an example of the time correction information.

The 1-satellite simplified time correction mode program 42c in FIG. 5 is an example of partial-satellite-signal-referenced time correction basis information that is the basis information for generating the time correction information (simplified time correction mode time 61a) based on a signal (GPS time) relating to the time in the signal transmitted from a single positioning information satellite (GPS satellite 15a). As described above, this time correction information is produced using time difference information (such as 1-satellite time correction mode average transmission delay time 58a) that is acquired when the time correction information generating unit (time correction mode execution program 32) generates the time correction information (time correction data 52a) based on the single-satellite-referenced time correction basis information (1-satellite time correction mode program 42b).

The 4-satellite time correction mode selection reference data 41a, the 1-satellite time correction mode selection reference data 41b, and the 1-satellite simplified time correction mode data selection reference data 41c that are stored in the time correction mode selection data storage unit 41 in FIG. 5 are an example of the selection information whereby the time correction information generating unit (time correction mode execution program 32) selects from the time correction basis information and executes the plural-satellite-referenced time correction basis information (4-satellite time correction mode program 42a), single-satellite-referenced time correction basis information (1-satellite time correction mode program 42b), and the partial-satellite-signal-referenced time correction basis information (1-satellite simplified time correction mode program 42c).

The 1-satellite time correction mode average transmission delay time 58a and the 1-satellite time correction mode average correction time 59a in FIG. 6 are an example of the average transmission delay time information and the average difference information that are acquired when the time correction information generating unit (time correction mode execution program 32) applies the single-satellite-referenced time correction basis information (1-satellite time correction mode program 42b).

The GPS time acquired from the TOW, the 1-satellite time correction mode average transmission delay time 58a, and the 1-satellite time correction mode average correction time 59a are examples of the basic time correction information (simplified time correction mode time 61a).

Step ST12 in FIG. 8 is an example of the third time correction information generating step and the third time information correction step.

After step ST12 in FIG. 8 ends, step ST13 determines if the 1-satellite simplified time correction mode ended normally. If not, the 1-satellite time correction mode executes again to assure the time is corrected with high precision. If the 1-satellite simplified time correction mode ends normally, control goes to step.

In step ST14 the 1-satellite positioning count calculation data 56a, the 1-satellite time correction mode average transmission delay time 58a, and the 1-satellite time correction mode average correction time 59a in FIG. 6 are reset and control loops back to the 4-satellite time correction mode in step ST2.

As described above, the invention first executes the 4-satellite time correction mode to correct the time with high precision. The 1-satellite time correction mode is then executed 24 hours later. Power consumption by the GPS wristwatch 10 is reduced in this mode because signals from fewer GPS satellites 15a are captured.

The 1-satellite time correction mode can still correct the time with high precision, however, because the time is corrected using data acquired in the 4-satellite time correction mode.

Once the 1-satellite time correction mode has executed four times consecutively, the 1-satellite simplified time correction mode executes. This mode further reduces the GPS satellite 15a signal reception time, and therefore further reduces power consumption by the GPS wristwatch 10.

However, this mode uses data acquired in the 1-satellite time correction mode, and can therefore still correct the time with high precision.

By thus using three different operating modes the power consumption of the GPS wristwatch 10 can be significantly reduced while continuing to precisely correct the time. The invention is therefore particularly suited to use in a wristwatch or similar device with an extremely small power supply.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A time correction device comprising:
   a positioning unit that receives signals from positioning information satellites orbiting the Earth and determines the position of the positioning unit;
   a time correction information storage unit that stores time correction information for correcting time information produced by a time information generating unit;
   a time information correction unit that corrects the time information based on the time correction information;
   a time correction basis information storage unit that stores time correction basis information, which is basis information for generating the time correction information;
   a time correction information generating unit that generates the time correction information based on the time correction basis information; and
   a selection information storage unit for storing selection information;
   wherein the time correction basis information includes
      plural-satellite-referenced time correction basis information that is the basis information for generating the time correction information based on signals from a plurality of positioning information satellites;
      single-satellite-referenced time correction basis information that is the basis information for generating the time correction information based on signals from a single positioning information satellite using positioning information acquired when the time correction information generating unit generates the time correction information based on the plural-satellite-referenced time correction basis information; and
      partial-satellite-signal-referenced time correction basis information that is the basis information for generating the time correction information based on a time-related signal in the signals received from a single positioning information satellite using time difference information acquired when the time correction information generating unit generates the time correction information based on the single-satellite-referenced time correction basis information; and
   the selection information is used by the time correction information generating unit to select from the time correction basis information and apply the plural-satellite-referenced time correction basis information, the single-satellite-referenced time correction basis information, or the partial-satellite-signal-referenced time correction basis information.

2. The time correction device described in claim 1, wherein:
   the plural positioning information satellites are four GPS (Global Positioning System) satellites;
   the plural-satellite-referenced time correction basis information is the basis information for generating
      the true transmission delay time and the position information of the positioning information satellites that are calculated based on an actually measured transmission delay time from transmission to reception of the signals from the four GPS satellites, and
      the transmission delay time that is the time produced by the time information generating unit; and
   the time correction information is the difference between the true transmission delay time and the measured transmission delay time.

3. The time correction device described in claim 2, wherein:
the single-satellite-referenced time correction basis information is the basis information for generating
the true transmission delay time by a calculation based on a satellite distance that is determined from a pseudo-current position and the GPS satellite position information that is identified from the GPS satellite orbital information,
where the position information that is the positioning information of the time correction device is used as the pseudo-current position, and
the transmission delay time that is the time produced by the time information generating unit.

4. The time correction device described in claim 3, wherein:
the time difference information used to determine the partial-satellite-signal-referenced time correction basis information includes an average of the transmission delay times acquired when the time correction information generating unit applies the single-satellite-referenced time correction basis information, and an average of the difference information;
the time-related signal is GPS time information from the GPS satellite; and
the GPS time information, the average transmission delay time, and the average difference information are the basis information of the time correction information.

5. A timekeeping device having a time correction device comprising:
a positioning unit that receives signals from positioning information satellites orbiting the Earth and determines the position of the positioning unit;
a time information generating unit that generates time information;
a time correction information storage unit that stores time correction information for correcting the time information;
a time information correction unit that corrects the time information based on the time correction information;
a time correction basis information storage unit that stores time correction basis information, which is basis information for generating the time correction information;
a time correction information generating unit that generates the time correction information based on the time correction basis information; and
a selection information storage unit for storing selection information;
wherein the time correction basis information includes
plural-satellite-referenced time correction basis information that is the basis information for generating the time correction information based on signals from a plurality of positioning information satellites;
single-satellite-referenced time correction basis information that is the basis information for generating the time correction information based on signals from a single positioning information satellite using positioning information acquired when the time correction information generating unit generates the time correction information based on the plural-satellite-referenced time correction basis information; and
partial-satellite-signal-referenced time correction basis information that is the basis information for generating the time correction information based on a time-related signal in the signals received from a single positioning information satellite using time difference information acquired when the time correction information generating unit generates the time correction information based on the single-satellite-referenced time correction basis information; and
the selection information is used by the time correction information generating unit to select from the time correction basis information and apply the plural-satellite-referenced time correction basis information, the single-satellite-referenced time correction basis information, or the partial-satellite-signal-referenced time correction basis information.

6. A time correction method of correcting the time information of a time information generating unit that generates time information based on time correction information, comprising:
a first time correction information generating step of a time correction information generating unit producing the time correction information based on plural-satellite-referenced time correction basis information that is the basis information for generating the time correction information based on signals received by a positioning unit from a plurality of positioning information satellites orbiting the Earth;
a first time information correcting step of a time information correction unit correcting the time information of the time information generating unit based on the time correction information generated by the first time correction information generating step;
a second time correction information generating step of the time correction information generating unit producing the time correction information based on single-satellite-referenced time correction basis information that is the basis information for generating the time correction information based on signals from a single positioning information satellite using positioning information acquired by the positioning unit in the first time correction information generating step;
a second time information correcting step of the time information correction unit correcting the time information of the time information generating unit based on the time correction information generated by the second time correction information generating step;
a third time correction information generating step of the time correction information generating unit producing the time correction information based on partial-satellite-signal-referenced time correction basis information that is the basis information for generating the time correction information based on a time-related signal in the signals received from a single positioning information satellite using time difference information acquired in the second time correction information generating step; and
a third time information correcting step of the time information correction unit correcting the time information of the time information generating unit based on the time correction information produced in the third time correction information generating step.

* * * * *